United States Patent [19]

McDonald

[11] Patent Number: 4,466,982
[45] Date of Patent: Aug. 21, 1984

[54] METHOD OF PREPARING A FISH FOOD PRODUCT

[76] Inventor: Randall A. McDonald, 21847 Lanark St. #30, Canoga Park, Calif. 91304

[21] Appl. No.: 266,825

[22] Filed: May 26, 1981

[51] Int. Cl.³ .......................... A23B 4/10; A23L 3/36; A23K 1/18
[52] U.S. Cl. ........................................ 426/1; 426/68; 426/393; 426/524; 426/576; 426/805
[58] Field of Search ..................... 426/68, 1, 805, 646, 426/524, 393, 576, 643, 129

[56] References Cited

U.S. PATENT DOCUMENTS

| | | | |
|---|---|---|---|
| 1,886,763 | 11/1932 | Trettin | 426/68 |
| 2,093,069 | 9/1937 | Bedford | 426/68 |
| 3,361,566 | 1/1968 | Axelrod | 426/1 |
| 3,889,007 | 6/1975 | Gunter et al. | 426/805 |
| 3,911,156 | 10/1975 | Swanson | 426/524 |

FOREIGN PATENT DOCUMENTS 55-118355  9/1980  Japan .................................. 426/805

Primary Examiner—George Yeung
Attorney, Agent, or Firm—Roger A. Marrs

[57] ABSTRACT

A fish food product is disclosed herein comprising a specially prepared ingredient attractive to and consumable by a variety of fish which is encased in a predetermined quantity of frozen water so as to provide a solid block of combined food product. A plurality of frozen food product blocks are prepared together in a tray form and subsequently, removed from the tray and deposited in a covered container for distribution to customers. One specially prepared ingredient is a beefheart composition having raw beefheart blended with gelatin and water and strained followed by pouring the blend into the receptacle of the tray form and then to freeze.

1 Claim, 4 Drawing Figures

METHOD OF PREPARING A FISH FOOD PRODUCT

BACKGROUND OF THE INVENTION

1. Field of the Invention

This invention relates to frozen fish food products and more particularly to novel such product which is prepared in a multiplicity of individual frozen units and dispensed in this form for subsequent use.

2. Brief Description of the Prior Art

In the past, it has been the conventional practice to introduce food to fish contained in a tank by sprinkling a quantity of the food onto the surface of the water contained in the tank. Inasmuch as the food is generally dry in the form of flakes or granules, the food has a tendency to remain in a cluster on the surface of the water and it will sink to lower depths only upon soaking of the flake or granule. Although some fish prefer feeding directly from the surface, a large variety of fish prefer to feed either from the bottom or at varying depths. Also, when food is poured or sprinkled onto the surface of the water, the person pouring or sprinkling usually provides too much or too little food since there is no simple way for pre-measuring or pre-determining the amount of food without utilizing measuring spoons or the like.

Still further problems have been encountered which stem from the fact that when a quantity of food has been poured or sprinkled into the tank, the fish have a tendency to consume as much food product at one time as possible. Such practice causes the fish to over-feed and to reduce the quantity of food rapidly which is intended to be available over a longer period of time.

Therefore, a long standing need has existed to provide a food product for fish which is pre-measured and which is readily dispensed into a tank of water which will disperse the food product at an even and relatively consistent amount over a prolonged period of time. Also, a need exists to provide an improved food product which may be readily dispensed to the fish without employing special measuring devices and which is more attractive to and consumable by a variety of fish.

SUMMARY OF THE INVENTION

Accordingly, the above problems and difficulties are obviated by the present invention which provides a novel fish food product comprising a specially prepared ingredient such as beefheart which is encased in pre-determined quantity of frozen water so as to provide a solid block of combined food product. A plurality of frozen food product blocks are prepared simultaneously and a tray having a plurality or multiplicity of receptacles for receiving the prepared ingredient and a quantity of water. After subjecting the tray containing food product and water to lower temperature, the food product is frozen and subsequently removed from the tray and deposited in a covered container for distribution to customers. In one form, the specially prepared ingredient is a beefheart product composed of raw beefheart blended with gelatin and water which is then strained to remove impurities followed by pouring the blend into the receptacles of the tray followed by subjecting to freezing.

Therefore, it is among the primary objects of the present invention to provide a novel fish food product which may be readily prepared in a multiplicity of frozen blocks containing food ingredients which may be subsequently introduced to a tank of water containing fish so that melting will release the ingredient for fish consumption.

Still another object of the present invention is to provide a novel fish food product which will readily release various ingredients of the product for fish consumption over a pre-determined time period so that the ingredients are dispersed evenly and at a regular rate.

Yet another object of the present invention is to provide a novel fish food ingredient which is composed primarily of beefheart and blended with gelatin and water so as to be readily frozen for handling and distribution purposes.

Another object of the present invention is to provide a novel fish food product which can be prepared in frozen blocks or cubes and subsequently introduced to water of a fish tank for release by melting of the blocks in the tank water.

BRIEF DESCRIPTION OF THE DRAWINGS

The features of the present invention which are believed to be novel are set forth with particularly in the appended claims. The present invention, both as to its organization and menaner of operation, together with further objects and advantages thereof, may best be understood by reference to the following description, taken in connection with the accompanying drawings in which:

DESCRIPTION OF PREFERRED EMBODIMENT

Figure 1:
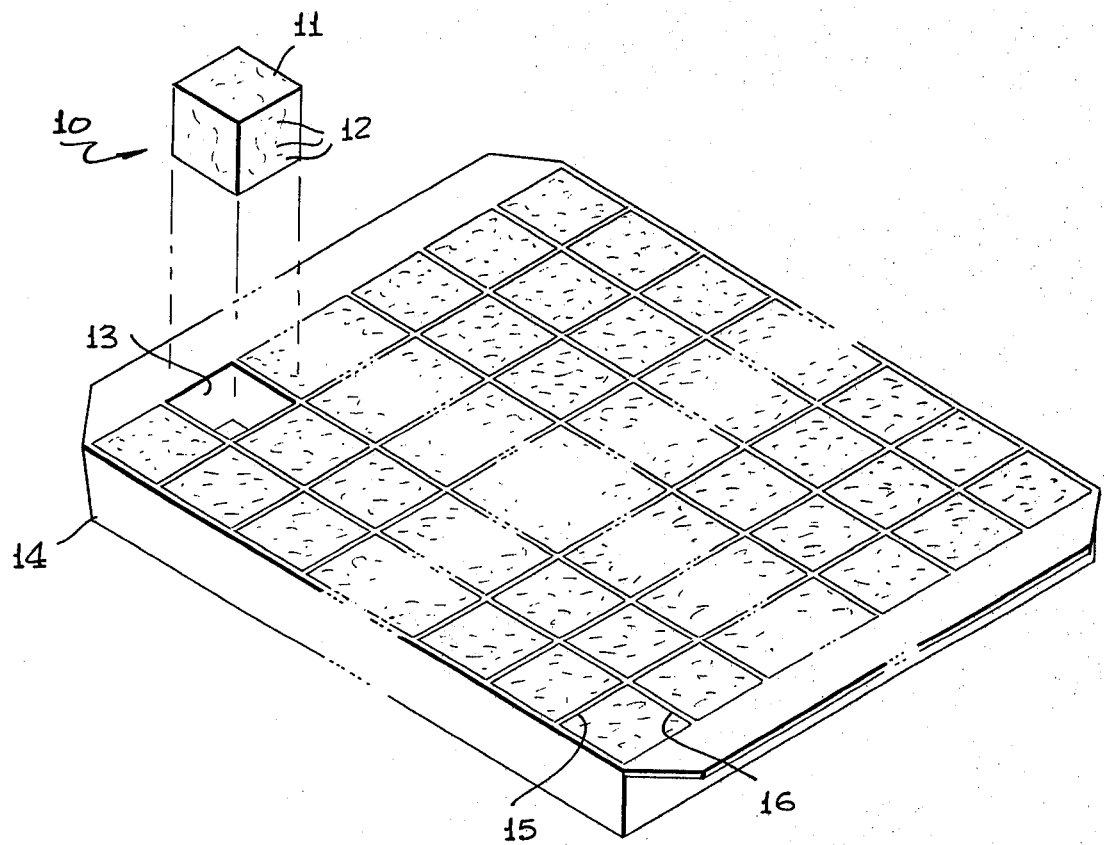
FIG. 1 is a front perspective view of a conventional tray having a multiplicity of receptacles for receiving fish food product and water so as to subject the combination to freezing.

Referring to FIG. 1, the novel food product of the present invention is shown in the general direction of arrow 10 which is a frozen block or cube of ice 11 having a quantity of attractive and consumable ingredients 12 for fish. The ingredients may take the form of a shrimp brine or a specially prepared ingredient such as a blended beefheart and gelatin combination (to be described later). The frozen food product is prepared by introducing a quantity of water to individual receptacles such as receptacle 13 provided in an ice tray 14. The ice tray 14 defines a multiplicity of receptacles or cavities by means of sidewall members 15 and 16 which are arranged at 90 degree angles with respect to each other and criss-cross between the sides and ends of the tray 14.

Preferably, the ingredient is prepared by mixing either the shrimp brine or the beefheart with a specific amount of water which is then poured evenly into the multiplicity of cavities provided in the tray 14. The loaded tray is then placed in a freezer and after the mixture in each of the respective cavities has been frozen, the tray is removed and the plurality of iced food blocks or cubes are then removed from the tray and packaged into a styrofoam container such as the container 17 illustrated in FIG. 2.

Figure 2:
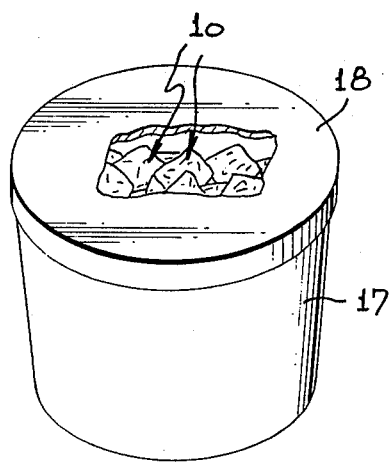
FIG. 2 is a perspective view of a container for holding a quantity of frozen food product cubes formed in the tray shown in FIG. 1.

Referring now in detail to FIG. 2, it can be seen that the container 17 includes a lid 18 for enclosing the plurality of frozen food blocks or cubes 10. Each container 17 including the lid 18 may bear the company name and a list of the ingredients so as to satisfy customer and governmental requirements. After the plurality of frozen food product blocks or cubes 10 have been packaged in the container 17, the container is placed in a freezer until the cubes are to be sold to customers.

Figure 3:
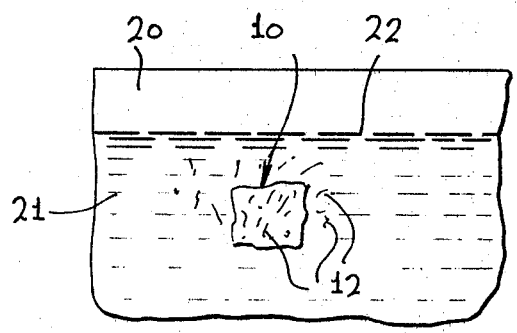
FIG. 3 is a fragmentary sectional view of a fish tank showing release of the fish food ingredient contained in the frozen blocks or cubes by virtue of a melting procedure.
Figure 4:
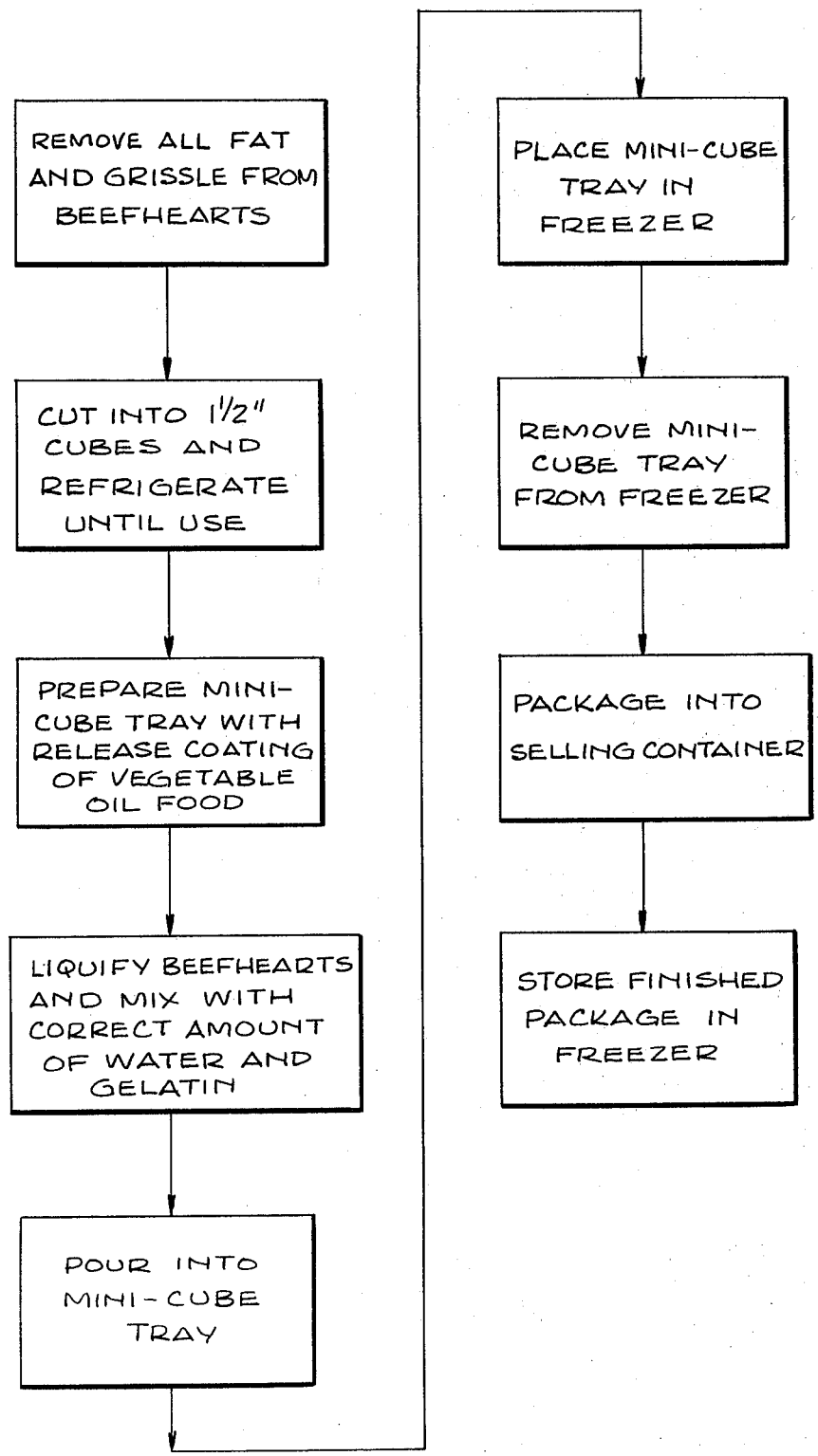
FIG. 4 is a block diagram showing the steps in preparing a novel and improved fish food product.

Referring now in detail to FIG. 3, a fish tank is represented by numeral 20 in which a quantity of water 21 is disposed and fish (not shown) are living in the water 21. The surface of the water is indicated by numeral 22. The frozen food block or cube 10 is introduced to the water 21 and as the water of the cube melts the food is released into the surrounding water 21. The food ingredients 12 is thereby dispersed at a regulated rate so that a mass of food ingredient is not released or available to the fish at any given moment. Also, introduction of the cube to the water 21 is convenient to the user by merely dropping or placing the cube into the water contained within the tank. This does not require sprinkling or pouring of an undetermined amount of dry food as is the conventional practice which would normally float in lumps on the surface 22.

A specially prepared ingredient which is attractive to and consumable by a variety of fish is represented by a beefheart product which is prepared by cutting or chopping one beefheart which yields four cups of cubed beefheart or 20 mini-cube trays of liquified beefheart mixture. The ingredients include four cups of cubed beefheart and twelve cups of water combined with six envelopes of unflavored gelatin.

Initially, all the gelatin is placed into a blender with four cups of cold water at about 68° F. This is blended for one quick second or just long enough to agitate the mixture so that the gelatin is softened. Next, two cups of hot water are added to the blended gelatin and water so that the gelatin dissolves. Next, the four cups of beefheart and remaining six cups of cold water are added to the dissolved gelatin and the resultant mixture is all blended together on a low speed for two minutes. Then, medium speed is applied for one minute and then the blended mixture is poured through a strainer which removes any remaining gristle. Next, the liquified and strained beefheart ingredient is poured into the cavities of the tray and the tray is introduced to a freezer where the liquified and poured beefheart product is frozen. As stated earlier, after it is frozen, the product is removed from the mini-cube or cavity tray and packaged into styrofoam containers. Then the container is placed in the freezer until it is sold to a customer.

Preferably, the frozen food product is maintained in the styrofoam cups or containers for approximately three days in order to preserve and cure the ingredients.

Therefore, in view of the foregoing, it can be seen that the fishfood product of the present invention provides a convenient method of feeding fish which is more beneficial to the fish than the conventional application of dry foods. No mess is made and the placement of a frozen cube into the fish water is convenient and simple for a user to perform. The remaining supply of fish food product is always available by visual inspection to the user and release of the food ingredients is at a controlled rate by virtue of the melting of the frozen water by the relative warm surrounding water in the fish tank.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A method of preparing a fish food product comprising the steps of:

preparing an ingredient which is attractive to and consumbable by a variety of fish by cutting or chopping one beefheart into several cups of cut or chopped beefheart;

adding said prepared beefheart ingredient to a quantity of water;

combining said added beefheart and water with unflavored gelatin by blending with at least one third more water;

blending hot water with said combined beefheart and gelatin combination to thoroughly dissolve the gelatin in said combination;

straining said beefheart and dissolved gelatin to remove any remaining gristle therefrom;

pouring said strained beefheart and gelatin into a plurality of storage cavities in a tray each of said storage cavities contains a predetermined quantity of water; and freezing said beefheart ingredient, gelatin and water stored in said tray to form frozen cubes; and introducing said frozen cubes to a water medium containing fish to melt the frozen cubes to controllably release the beefheart ingredient into the water medium for fish consumption.

* * * * *